(12) United States Patent
Fehringer (10) Patent No.: US 9,527,707 B1
(45) Date of Patent: Dec. 27, 2016

(54) LAWN MOWER LIFT

(71) Applicant: Thomas T. Fehringer, Lindsay, NE (US)

(72) Inventor: Thomas T. Fehringer, Lindsay, NE (US)

( * ) Notice: Subject to any disclaimer, the term of this patent is extended or adjusted under 35 U.S.C. 154(b) by 0 days.

(21) Appl. No.: 14/753,822

(22) Filed: Jun. 29, 2015

(51) Int. Cl.
*B66F 7/26* (2006.01)
*B66F 7/02* (2006.01)
*B66D 3/04* (2006.01)
*B60S 9/08* (2006.01)
*B60P 1/02* (2006.01)

(52) U.S. Cl.
CPC . *B66F 7/26* (2013.01); *B66D 3/04* (2013.01); *B66F 7/02* (2013.01); *B60P 1/02* (2013.01); *B60S 9/08* (2013.01)

(58) Field of Classification Search
CPC ............... B66F 7/26; B66F 7/10; B66F 7/04; B66F 7/02; B66F 7/243; B66D 3/04; B60P 1/02; B66B 9/16; B66B 11/06; B60S 9/02; B60S 9/04
USPC .................................................. 254/324–325
See application file for complete search history.

(56) References Cited

U.S. PATENT DOCUMENTS

| | | | | | |
|---|---|---|---|---|---|
| 300,344 | A | * | 6/1884 | Chamblin et al. ....... | B66D 1/26 254/286 |
| 351,592 | A | * | 10/1886 | Gillman ................... | B66D 1/36 254/336 |
| 983,957 | A | * | 2/1911 | Trantham ................. | B66D 3/04 254/338 |
| 1,239,524 | A | * | 9/1917 | Root ...................... | A61H 3/008 212/345 |
| 1,273,143 | A | * | 7/1918 | Bryan ..................... | B66F 11/04 182/141 |
| 2,533,981 | A | * | 12/1950 | Weaver ................... | B66F 7/246 187/218 |
| 2,569,982 | A | * | 10/1951 | Estel, Jr. .................. | B66F 7/28 187/217 |
| 2,593,635 | A | * | 4/1952 | Walker .................... | B66F 7/02 187/210 |
| 2,910,186 | A | * | 10/1959 | Mobroten ............... | D06F 57/00 211/119.15 |
| 2,985,430 | A | * | 5/1961 | Greenwood .......... | B66C 23/201 254/338 |
| 3,006,485 | A | * | 10/1961 | Martin ................... | B65G 67/00 104/98 |
| 3,300,186 | A | * | 1/1967 | Lee ........................ | B66C 19/00 254/334 |

(Continued)

*Primary Examiner* — Emmanuel M Marcelo
*Assistant Examiner* — Michael Gallion
(74) *Attorney, Agent, or Firm* — Dennis L. Thomte; Thomte Patent Law Office LLC (57) ABSTRACT

A lawn mower lift is provided for lifting one end of a lawn mower to enable a person to gain access to the underside of the lawn mower to perform maintenance or repair tasks on the lawn mower. The lawn mower lift includes first and second upstanding post members having a support rail extending between the upper ends of the post members. A horizontally disposed wheel is vertically slidably mounted on each of the post members for supporting a pair of wheels of the lawn mower thereon. A winch is mounted on the support rail and has a pair of winch cables secured to the wheel supports. The winch, when operated in a first direction, raises one end of the lawn mower. The winch, when operated in a second direction, lowers the lawn mower.

2 Claims, 6 Drawing Sheets

(56) References Cited

U.S. PATENT DOCUMENTS

| | | | | |
|---|---|---|---|---|
| 3,338,334 A * | 8/1967 | Matthews | B66F 7/04 | 187/213 |
| 3,604,743 A * | 9/1971 | Kinkopf | B66C 7/00 | 294/81.21 |
| 3,643,365 A * | 2/1972 | Demmert | A01K 73/12 | 43/8 |
| 3,665,527 A * | 5/1972 | Gonzalez | A47C 17/84 | 5/10.2 |
| 3,804,206 A * | 4/1974 | Bubik | B66F 7/243 | 187/217 |
| 3,863,890 A * | 2/1975 | Ruffing | B66F 7/0625 | 254/10 C |
| 3,973,754 A * | 8/1976 | Chadwick, Jr. | B66C 19/005 | 180/415 |
| 4,002,321 A * | 1/1977 | Shaw | B66D 1/365 | 212/97 |
| 4,058,293 A * | 11/1977 | Kameda | B66F 7/22 | 254/89 H |
| 4,064,999 A * | 12/1977 | Young | E04F 21/1811 | 182/141 |
| 4,084,790 A * | 4/1978 | Molnar | B66F 7/04 | 187/215 |
| 4,209,276 A * | 6/1980 | Rosen | E04H 6/06 | 187/213 |
| 4,212,374 A * | 7/1980 | Bubik | B66F 7/26 | 187/204 |
| 4,238,114 A * | 12/1980 | Migliorati | B66F 7/26 | 187/220 |
| 4,266,904 A * | 5/1981 | Fadness | B66C 1/101 | 212/319 |
| 4,490,085 A * | 12/1984 | Adami nee Michelini | B66F 7/22 | 187/206 |
| 4,500,071 A * | 2/1985 | Bagwell | B66F 7/04 | 254/423 |
| 4,664,584 A * | 5/1987 | Braun | A61G 3/06 | 187/217 |
| 4,674,601 A * | 6/1987 | Benjamin | B66B 9/00 | 14/71.3 |
| 4,763,761 A * | 8/1988 | McKinsey | B66F 7/04 | 187/207 |
| 4,856,618 A * | 8/1989 | Isogai | B66F 7/04 | 187/208 |
| 4,901,980 A * | 2/1990 | Hansen | B25H 1/0007 | 254/124 |
| 4,928,927 A * | 5/1990 | Fredrick | B66F 19/005 | 254/279 |
| 4,941,645 A * | 7/1990 | Hall | B62B 3/0637 | 254/324 |
| 5,048,799 A * | 9/1991 | Aronowitsch | B66D 1/7468 | 242/323 |
| 5,074,528 A * | 12/1991 | Long, Jr. | B66D 1/54 | 254/285 |
| 5,211,264 A * | 5/1993 | Beattie | B66F 7/04 | 187/208 |
| 5,362,196 A * | 11/1994 | Beattie | B66F 7/04 | 254/89 H |
| 5,397,207 A * | 3/1995 | Arellano | E04F 21/1805 | 254/98 |
| 5,497,854 A * | 3/1996 | Fang | E04H 6/06 | 187/209 |
| D378,457 S * | 3/1997 | Page | D34/28 | |
| 5,715,958 A * | 2/1998 | Feider | B66C 1/101 | 212/273 |
| 5,772,183 A * | 6/1998 | Sears | B66F 19/00 | 248/333 |
| 5,918,861 A * | 7/1999 | Parker | B66C 23/48 | 212/202 |
| 5,937,972 A * | 8/1999 | Andre | B60P 1/02 | 187/210 |
| 5,954,160 A * | 9/1999 | Wells, Sr. | B66F 7/04 | 187/203 |
| 5,984,404 A * | 11/1999 | Novoa | B62D 33/0612 | 296/190.01 |
| 6,138,846 A * | 10/2000 | Baumann | B66C 1/663 | 212/326 |
| 6,254,171 B1 * | 7/2001 | Young, Sr. | B60P 3/34 | 296/165 |
| 6,279,685 B1 * | 8/2001 | Kogan | B66F 7/28 | 187/203 |
| 6,507,962 B2 * | 1/2003 | Thurston | A47C 17/84 | 5/10.1 |
| 6,550,746 B2 * | 4/2003 | Drost | A22B 7/001 | 254/332 |
| 6,554,253 B1 * | 4/2003 | Dobmeier | B62D 43/045 | 254/323 |
| 6,685,170 B1 * | 2/2004 | Gwynn | B66C 5/025 | 254/325 |
| 6,695,291 B2 * | 2/2004 | Kleimeyer | A63G 31/00 | 254/266 |
| 6,695,688 B1 * | 2/2004 | Owen | A22B 5/06 | 452/185 |
| 6,698,723 B1 * | 3/2004 | Antonini | B60P 7/083 | 254/391 |
| 6,814,342 B1 * | 11/2004 | Perlstein | B66F 7/02 | 254/1 |
| 6,959,918 B1 * | 11/2005 | Samuels | B60J 7/106 | 248/327 |
| 6,969,049 B2 * | 11/2005 | Bilcik | A01M 31/006 | 254/278 |
| 6,983,979 B2 * | 1/2006 | Rasmussen | A47C 17/84 | 296/156 |
| 7,059,956 B1 * | 6/2006 | Summerlin | A22B 5/06 | 452/192 |
| 7,150,449 B1 * | 12/2006 | Dueck | B62H 3/12 | 248/320 |
| 7,243,870 B2 * | 7/2007 | Pook | A63J 1/028 | 242/278 |
| 7,325,785 B2 * | 2/2008 | Krengel | A47B 5/00 | 211/17 |
| 7,458,563 B1 * | 12/2008 | Liu | A01M 31/02 | 254/334 |
| 7,610,636 B2 * | 11/2009 | Holmes | B60P 3/36 | 105/317 |
| 7,806,755 B1 * | 10/2010 | Martinelli | A22B 5/06 | 452/185 |
| 7,874,026 B2 * | 1/2011 | Gudenkauf | A47C 17/84 | 5/10.1 |
| 8,006,956 B2 * | 8/2011 | Payne | B65D 88/125 | 212/166 |
| 8,328,029 B1 * | 12/2012 | Binsfeld | B66F 7/02 | 187/240 |
| 8,544,823 B2 * | 10/2013 | Imberi | B66D 1/36 | 254/338 |
| 8,776,284 B2 * | 7/2014 | Jones | B60P 3/39 | 5/10.2 |
| 8,967,403 B2 * | 3/2015 | Won | B66C 19/00 | 212/315 |
| 2002/0043137 A1 * | 4/2002 | Yeo | B23B 5/04 | 82/112 |
| 2002/0084238 A1 * | 7/2002 | Zingerman | B66C 23/22 | 212/179 |
| 2002/0178497 A1 * | 12/2002 | Thurston | A47C 17/84 | 5/10.1 |
| 2004/0046161 A1 * | 3/2004 | Payne | B60J 7/102 | 254/266 |
| 2004/0262949 A1 * | 12/2004 | Rasmussen | A47C 17/84 | 296/158 |
| 2006/0045710 A1 * | 3/2006 | Hiebert | B66F 7/28 | 414/631 |
| 2009/0020369 A1 * | 1/2009 | Warachka | B66F 9/12 | 187/231 |
| 2009/0095944 A1 * | 4/2009 | Gaines | B66D 3/04 | 254/334 |
| 2009/0120906 A1 * | 5/2009 | Grigsby | B65D 85/68 | 217/36 |
| 2010/0001241 A1 * | 1/2010 | Rentschler | B66F 9/06 | 254/2 R |

(56) References Cited

U.S. PATENT DOCUMENTS

| | | | | |
|---|---|---|---|---|
| 2010/0213429 A1* | 8/2010 | Drake | ................ | B66F 7/10 254/89 R |
| 2010/0264384 A1* | 10/2010 | Realegeno-Amaya | .. | B66D 1/08 254/2 R |
| 2010/0314386 A1* | 12/2010 | Buonerba | ............ | B65D 90/047 220/1.6 |
| 2011/0127477 A1* | 6/2011 | Kokolis | ................. | B66C 13/16 254/285 |
| 2011/0155683 A1* | 6/2011 | Kim | ................ | B66C 1/101 212/307 |
| 2013/0146824 A1* | 6/2013 | Drake | ................ | B66F 7/12 254/92 |
| 2014/0131301 A1* | 5/2014 | Newkirk | ................. | A61G 7/10 212/324 |
| 2014/0138340 A1* | 5/2014 | Miller | ................ | B66D 1/36 212/336 |
| 2014/0159410 A1* | 6/2014 | Rasmussen | ............ | A47C 19/20 296/24.33 |
| 2014/0221104 A1* | 8/2014 | Drake | ................ | F16D 9/06 464/37 |
| 2015/0201629 A1* | 7/2015 | Lockwood | ............ | A22B 5/161 452/125 |

* cited by examiner

LAWN MOWER LIFT

BACKGROUND OF THE INVENTION

Field of the Invention

This invention relates to a lawn mower lift for raising one end of a lawn mower to enable a person to gain access to the underside of the lawn mower to perform maintenance or repair tasks. Even more particularly, this invention relates to a lawn mower lift which is safe to use. Even more particularly, this invention relates to a lawn mower lift which may be used with lawn mowers of different sizes.

Description of the Related Art

Many types of jacks or lifts have been provided to enable a person to raise or lift the front end of a walk-behind lawn mower or a riding lawn mower so that the person may access the underside of the lawn mower to replace or sharpen the mower blade(s), clean the underside, etc. However, the prior art lawn mower lifts or jacks are extremely large, completely undersized, expensive and not portable.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A lawn mower lift is disclosed which includes a first vertically disposed post member having upper and lower ends with the first post member having a support surface engaging base at its lower end. The lawn mower lift also includes a second vertically disposed post member having upper and lower ends with the lower end thereof having a support surface engaging base thereon. The second post member is horizontally spaced from the first post member. The lawn mower lift also includes a horizontally disposed and telescopic support rail, having first and second ends, which extends between the upper ends of the first and second post members. A first tubular support member is vertically slidably mounted on the first post member with the first tubular support member having inner and outer sides. A second tubular support member is vertically slidably mounted on the second post member and has inner and outer sides. A first horizontally disposed wheel support is secured to the first tubular member which extends inwardly from the inner side of the first tubular member for vertical movement therewith. A second horizontally disposed wheel support is secured to the second tubular support member which extends inwardly from the inner side of the second tubular support member for vertical movement therewith.

A first pulley is rotatably mounted on the upper side of the support rail at the first end thereof and a second pulley is rotatably mounted on the upper side of the support rail at the second end thereof. A winch is mounted on the upper side of the support rail which includes a horizontally disposed axle which is disposed transversely with respect to the longitudinal axis of the support rail. The winch includes means for rotating the axle thereof in first and second directions.

A first winch cable, having first and second ends, has its first end secured to and wound upon the axle in a first direction. The first cable extends generally horizontally from the winch so as to pass around the first pulley and thence downwardly therefrom. The second end of the first cable is secured to the first tubular support member. A second winch cable, having first and second ends, has its first end secured to and wound upon the axle in a second direction which is opposite to the first direction. The second cable extends generally horizontally from the winch so as to pass around the second pulley and thence downwardly therefrom. The second end of the second cable is secured to the second tubular member. The first wheel support is configured to have a wheel of a lawn mower supported thereon. The second wheel support is configured to have a wheel of a lawn mower supported thereon.

The rotation of the axle in the first direction causes the first and second tubular supports and the first and second wheel supports to be moved vertically upwardly on the first and second post members respectively. The rotation of the axle in the second direction causes the first and second tubular supports and the first and second wheel supports to be moved vertically downwardly on the first and second post members.

In the Preferred Embodiment, the mower lift includes means for locking the first and second tubular support members in various vertical positions with respect to the first and second post members. In the Preferred Embodiment, each of the wheel supports are generally square-shaped. In the Preferred Embodiment, the lawn mower lift is portable.

It is therefore a principal object of the invention to provide an improved lawn mower lift.

A further object of the invention is to provide an improved lawn lower lift which may accommodate lawn mowers of different sizes.

A further object of the invention is to provide a lawn mower lift of the type described which is safe to use.

A further object of the invention is to provide a lawn mower lift which is able to conveniently raise the forward end of a lawn mower to a height wherein the underside of the lawn mower is accessible for performing maintenance and/or repair tasks.

A further object of the invention is to provide a lawn mower lift of the type described which is economical of manufacture, is portable, and is refined in appearance.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Figure 1:
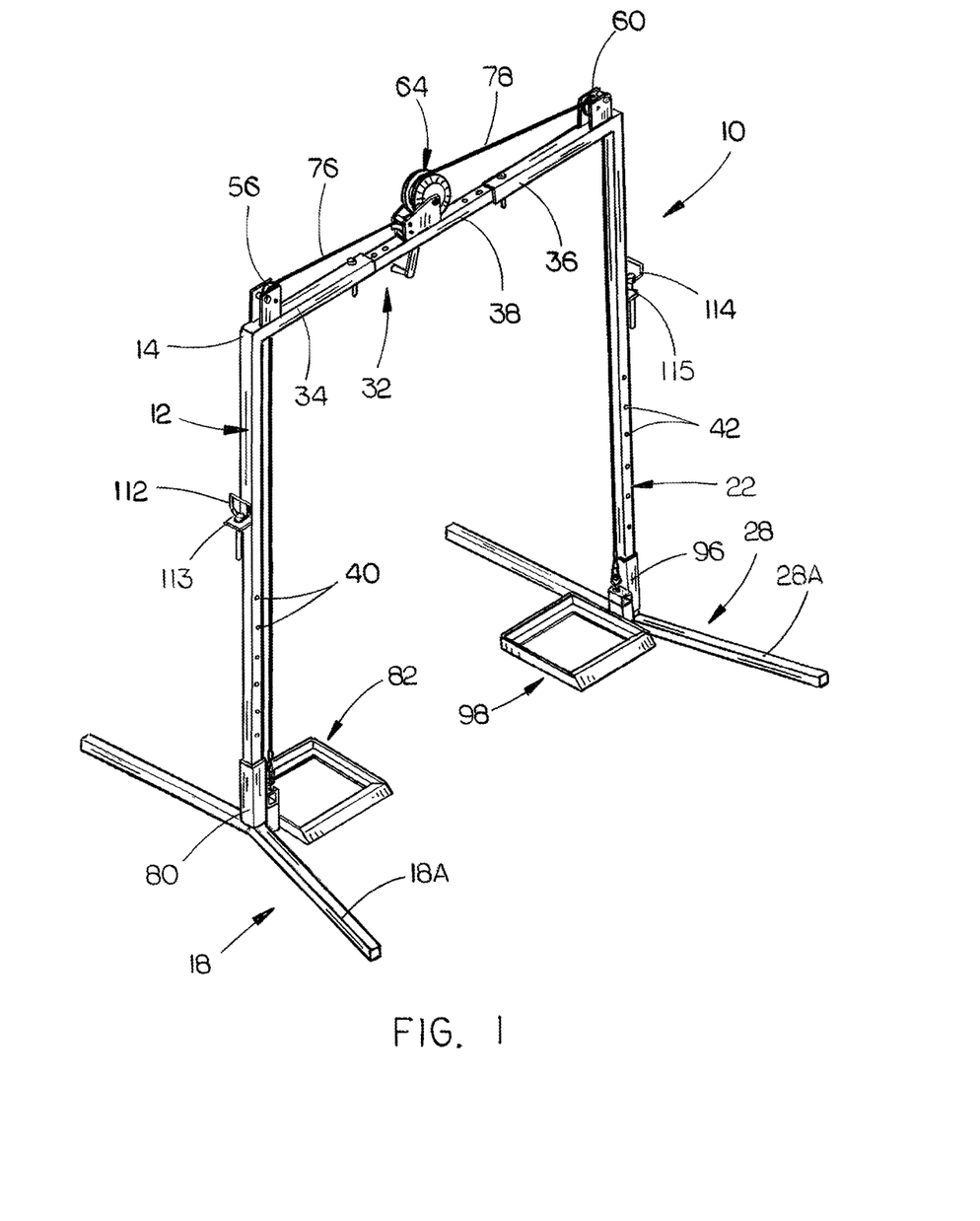
FIG. 1 is a perspective view of the lawn mower lift of this invention as seen from the approach side of the lift.
Figure 2:
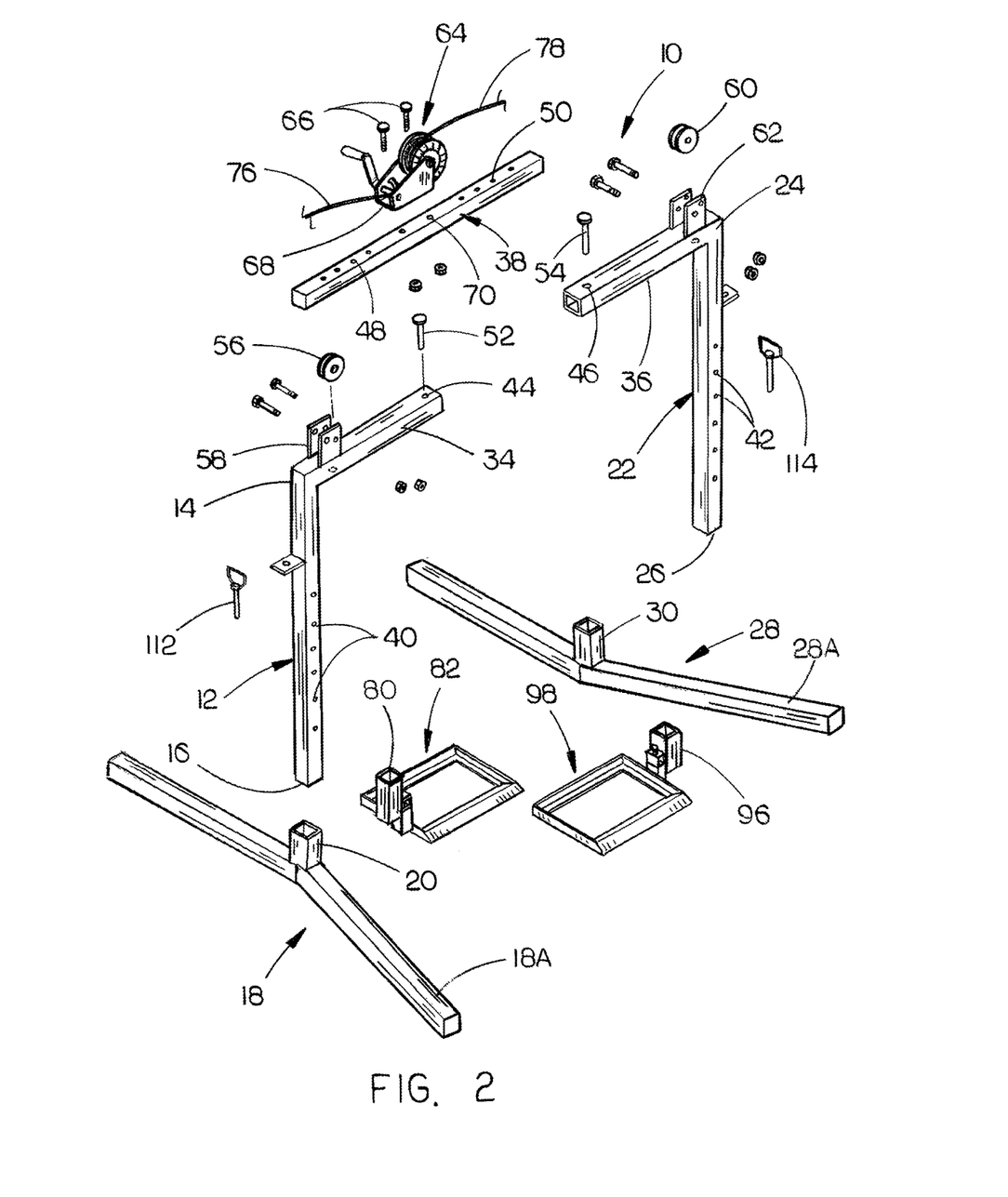
FIG. 2 is an exploded perspective view of the mower lift of this invention as seen from the approach side of the lift.

The numeral 10 refers to the lawn mower lift of this invention. Lift 10 includes a first vertically disposed post member 12 having an upper end 14 and a lower end 16. Base 18 is selectively removably secured to the lower end 16 of post member 12 and is configured to support post member 12 on a supporting surface. As seen, base 18 includes an upstanding tube 20 which receives the lower end of post member 12. A screw 21 extends inwardly through tube 20 into post member 12 to secure the post member to the base 18. Preferably, the base 18 has one leg 18A which extends outwardly and away from tube 20 at an angle so that one wheel of the mower may pass thereby as will be described hereinafter. Lift 10 also includes a vertically disposed second post member 22 having an upper end 24 and a lower end 26. An angular base 28 is secured to the lower end 26 of post member 22 and is configured to support post member 20 on a supporting surface. As seen, base 28 includes an upstanding tube 30 which receives the lower end of post member 22. Preferably, the base 28 has one leg 28A which extends outwardly and away from tube 30 so that the other wheel of the mower may pass thereby as will be described hereinafter.

Lift 10 further includes a horizontally disposed support rail 32 which is comprised of a first tube member 34, a second tube member 36, and a connector tube 38. The outer end of tube member 34 is connected to the upper end of post member 12 and the outer end of tube member 36 is connected to the upper end of post member 22. Connector tube 38 has its ends selectively telescopically received in the inner ends of tube members 34 and 36 respectively.

The first post member 12 has a plurality of vertically spaced-apart pin openings 40 formed therein. The second post member 22 has a plurality of vertically spaced-apart pin openings 42 formed therein. Tube member 34 has a vertically disposed bolt or pin opening 44 formed therein. Tube member 36 has a vertically disposed bolt or pin opening 46 formed therein. Connector tube 38 has a plurality of spaced-apart pin or bolt openings 48 formed therein at one end thereof and has a plurality of spaced-apart pin or bolt openings 50 formed therein at its outer end.

The length of the support rail 32 may be selectively changed by a pin or bolt 52 extending downwardly through opening 44 in tube member 34 and through one of the openings 48 in connector tube 38 as well as a pin or bolt 54 extending downwardly through opening 46 in tube member 36 and through one of the openings 50 in connector tube 38.

A pulley 56 is rotatably mounted in bracket 55 which is secured to the outer end of tube member 34. A pulley 60 is rotatably mounted in bracket 62 which is secured to the outer end of tube member 36.

Figure 6:
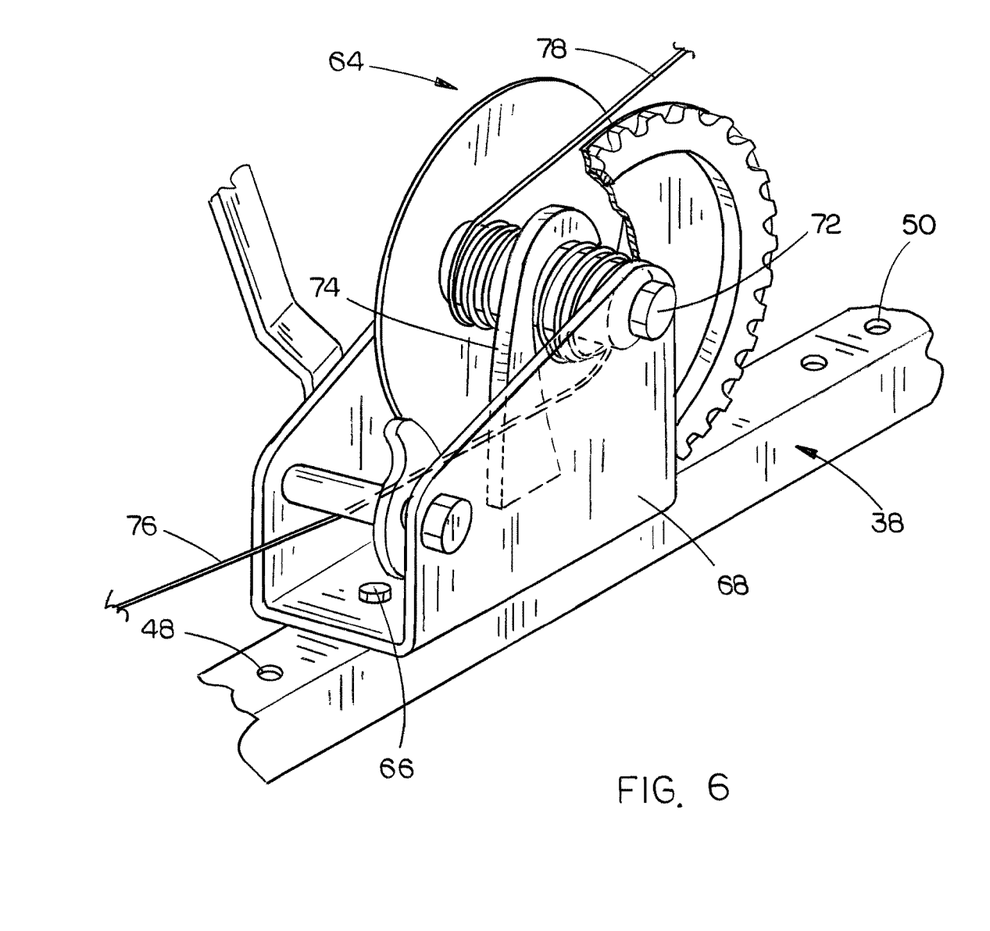
FIG. 6 is a perspective view of the winch portion of the instant invention as seen from the approach side of the lift.

The numeral 64 refers to a substantially conventional crank operated winch which is secured to connector tube 38 by bolts 66 extending through the frame 68 of winch 64 and through the bolt openings 70 in connector tube 38. The only difference between winch 64 and the prior art winches is that the axle 72 has a divider plate 74 positioned between the ends thereof.

The numeral 76 refers to a first cable having one end secured to axle 72 and wound thereon in a first direction (counter-clockwise). Cable 76 extends horizontally from winch 64, thence around pulley 56, and thence downwardly therefrom. The numeral 78 refers to a second cable having one end secured to axle 72 and wound thereon in a second direction (clockwise). Cable 78 extends horizontally from winch 64, thence around pulley 60, and thence downwardly therefrom. As seen, cable 76 is wound upon axle 72 at one side of divider plate 74 and cable 78 is wound upon axle 72 at the other side of plate 74. Thus as viewed in FIG. 6, if axle is rotated in a clockwise direction, the cables 76 and 78 will be unwound from axle 72 and, if the axle 72 is rotated in a counter-clockwise direction, the cables 76 and 78 will be wound upon axle 72.

Figure 3:
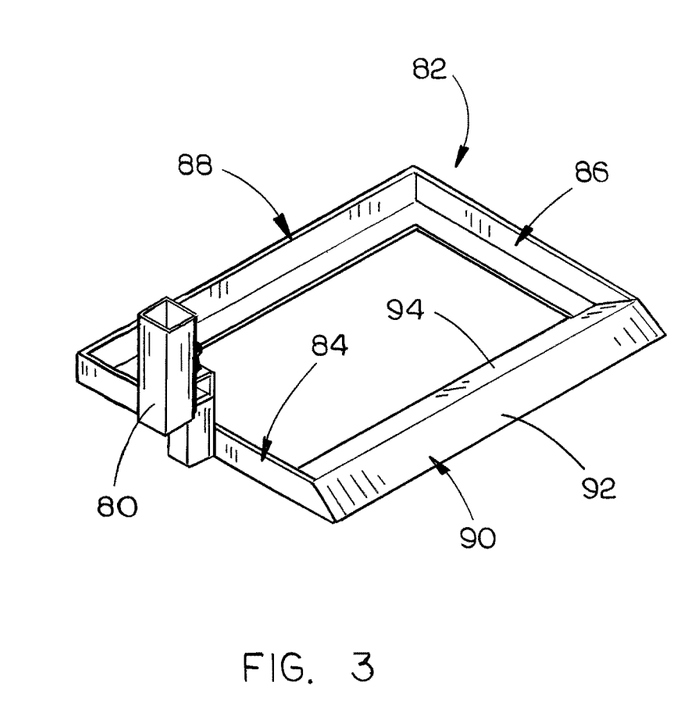
FIG. 3 is a perspective view of one of the wheel supports of this invention.

The numeral 80 refers to a tubular member which is slidably movably mounted on post member 12. A horizontally disposed wheel support 82 is secured to tubular member 80 for movement therewith and extends inwardly therefrom. As seen, the free end of cable 76 is secured to tubular member 80 and wheel support 82. Wheel support 82 includes an inner frame member 82, an outer frame member 86, a front frame member 88 and a rear frame member 90 which includes inclined ramp portions 92 and 94.

Figure 4:
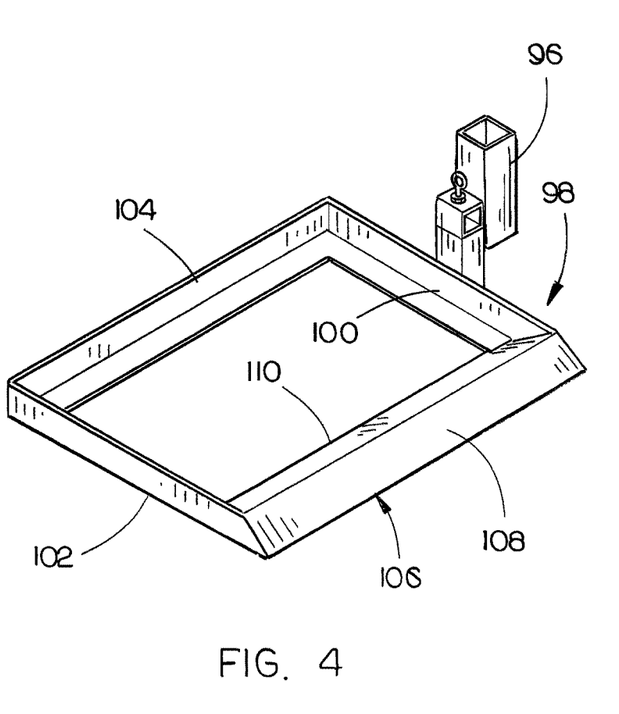
FIG. 4 is a perspective end view of the other wheel support of this invention.
Figure 5:
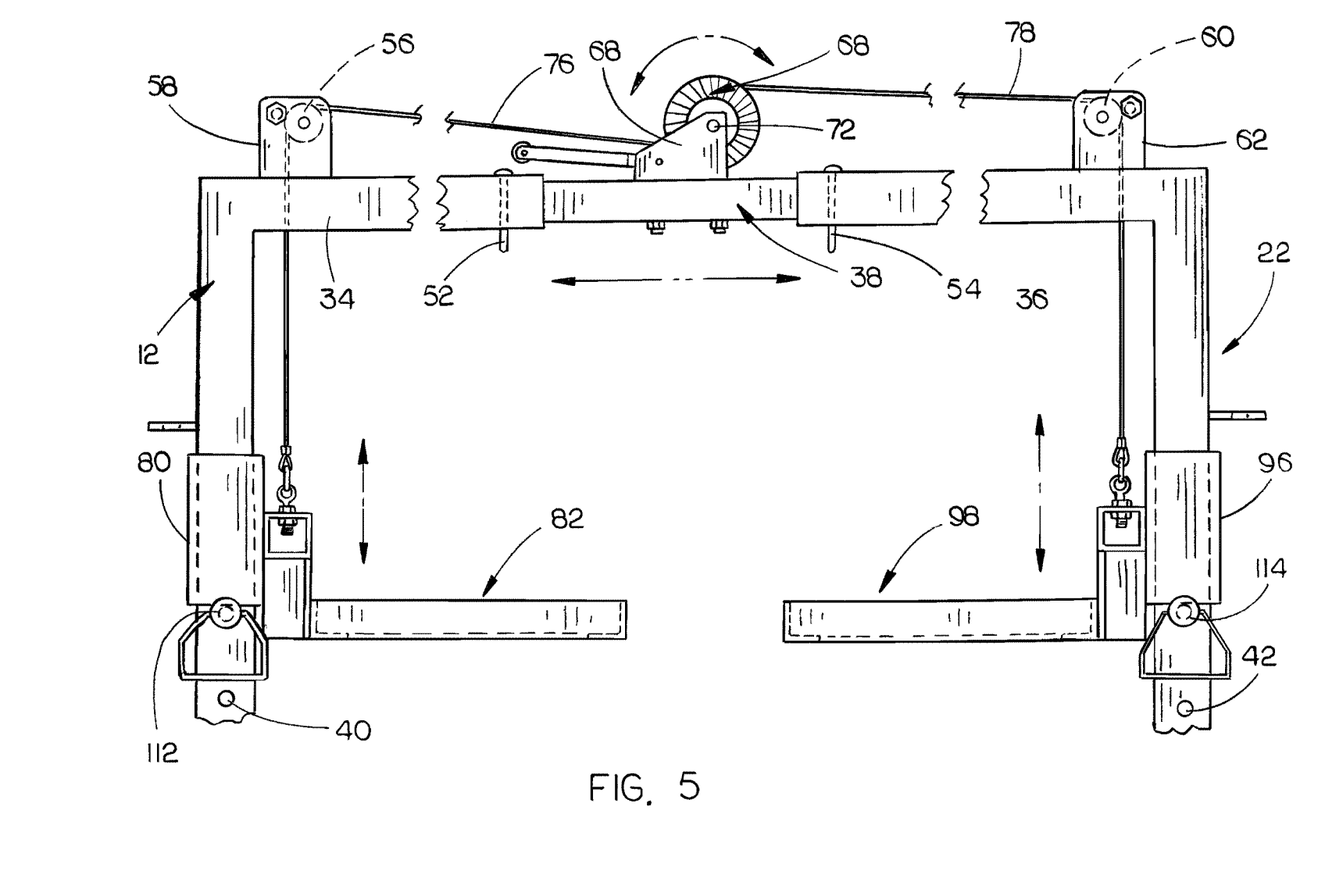
FIG. 5 is a partial end view of the mower lift of this invention as seen from the approach side of the lift.

The numeral 96 refers to a tubular member which is slidably movably mounted on post member 22. A horizontally disposed wheel support 98 is secured to tubular member 96 for movement therewith and extends inwardly therefrom. As seen, the free end of cable 78 is secured to tubular member 96 and wheel support 98. Wheel support 98 includes an inner frame member 100, an outer frame member 102, a front frame member 104 and a rear frame member 106 which includes inclined ramp portions 108 and 110.

The numeral 112 refers to a locking pin which may be stored in bracket 113 which extends from post member 12. The numeral 114 refers to a locking pin 114 which may be stored in bracket 115 which extends from post member 22.

The operation of lift 10 will now be described. Initially, the wheel supports 82 and 98 will be positioned at the lower ends of post members 12 and 22 respectively. The support rail 32 will be length adjusted to accommodate the width of the mower 116. The mower 116 is then moved into the mower lift 10 between the legs 18A and 28 and between the post members 12 and 22. The mower 116 is moved inwardly into the mower lift 10 until the front wheels of the mower 116 are positioned in wheel supports 82 and 98. The movement of the front wheels of the mower 116 into and onto the wheel supports 82 and 98 is enhanced by the ramp portions 92, 94 and 108, 110. When the front wheels of the mower 116 are positioned on and in the wheel supports 82 and 98, the mower 116 will be positioned in a neutral position.

The winch 64 is then operated to rotate axle 72 of winch 64 in a counter-clockwise direction to cause the cables 76 and 78 to raise tubular members 80 and 96 and the wheel supports 82 and 98 with respect to post members 12 and 22. The front end of the mower 116 is raised until sufficient access is provided to the underside of the mower 116. The locking pin 112 is then inserted into the opening 40 which is directly below the lower end of tubular member 80. The locking pin 114 is then inserted into the opening 42 which is directly below the lower end of tubular member 96. The winch 64 is then reversed somewhat until the lower ends of tubular members 82 and 96 engage the locking pins 112 and 114 to limit further downward movement of tubular members 80 and 96 at the wheel supports 82 and 98. The brake of the mower 116 will then be engaged.

Figure 7:
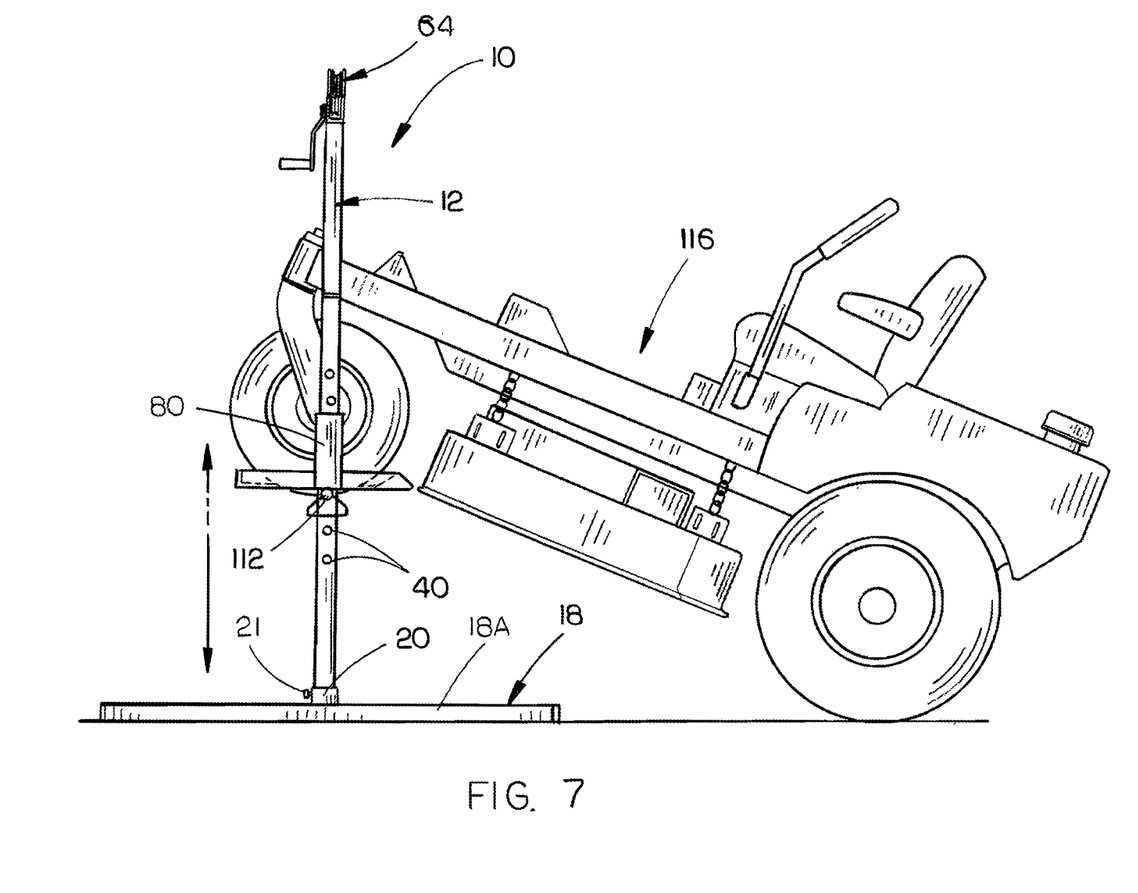
FIG. 7 is a side view illustrating the mower lift of this invention having lifted a mower to an elevated position.

With the mower 116 in the position of FIG. 7, repair or maintenance of the underside of the mower may be accomplished in a safe manner. When the repair or maintenance task has been accomplished, the brake of the mower is released. The winch 64 is then operated to slightly raise the tubular members 80 and 96 upwardly with respect to the locking pins 112 and 114. The locking pins 112 and 114 are then removed from the post members 12 and 22 respectively. The winch 64 is then operated to lower the wheel supports 82 and 98 to the supporting surface. The mower 116 is then backed from the wheel supports 82 and 98.

Thus, it can be seen that a novel mower lift 10 has been provided which is able to be used with various sizes of mowers, is convenient to use, and is safe to use.

Thus, it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A lift for a lawn mower having a pair of front wheels and a pair of rear wheels, comprising:

a vertically disposed first post member having an upper end, a lower end, a first side, and a second side;

said first post member having a plurality of vertically spaced-apart pin openings formed therein;

a horizontally disposed first support leg having inner and outer ends;

a horizontally disposed second support leg having inner and outer ends;

said inner ends of said first and second support legs being joined together;

a vertically disposed first hollow tube having upper and lower ends;

said lower end of said first hollow tube being secured to said inner ends of said first and second support legs so as to extend upwardly therefrom;

said lower end of said first post member being selectively removably received by said first tube;

a vertically disposed second post member having an upper end, a lower end, a first side, and a second side;

said second post member having a plurality of vertically spaced-apart pin openings formed therein;

a horizontally disposed third support leg having inner and outer ends;

a horizontally disposed fourth support leg having inner and outer ends;

said inner ends of said third and fourth support legs being joined together;

a vertically disposed second hollow tube having upper and lower ends;

said lower end of said second hollow tube being secured to said inner ends of said third and fourth support legs so as to extend upwardly therefrom;

said lower end of said second post member being selectively removably received by said second tube;

a horizontally disposed and elongated first support tube, having upper and lower sides and inner and outer ends;

said inner end of said first support tube being secured to said upper end of said first post member;

a horizontally disposed and elongated second support tube, having upper and lower sides and inner and outer ends;

said inner end of said second support tube being secured to said upper end of said second post member;

a horizontally disposed and elongated connector tube, having upper and lower sides and first and second ends;

said first end of said connector tube being adjustably slidably received by and secured to said outer end of said first support tube;

said second end of said connector tube being adjustably slidably received by and secured to said outer end of said second support tube;

a first tubular support member vertically slidably embracing said first post member;

said first tubular support member having inner and outer sides;

a second tubular support member vertically slidably embracing said second post member;

said second tubular support member having inner and outer sides;

a first horizontally disposed wheel receiving support secured to said first tubular support member which extends inwardly from said inner side of said first tubular support member for vertical movement therewith;

a second horizontally disposed wheel receiving support secured to said second tubular support member which extends inwardly from said inner side of said second tubular support member for vertical movement therewith;

each of said wheel receiving supports including:

(a) an elongated and horizontally disposed first support member having inner and outer ends;

(b) an elongated and horizontally disposed second support member, having rearward and forward ends, which extends transversely forwardly from said inner end of said first support member;

(c) an elongated and horizontally disposed third support member, having inner and outer ends, which extends transversely inwardly from said forward end of said second support member;

(d) an elongated and horizontally disposed fourth support member, having forward and rearward ends, which extends transversely from said inner end of said third support member with said rearward end of said fourth support member being secured to said inner end of said first support member;

(e) said second, third and fourth support member having an angular cross-section with a horizontally disposed base portion and a vertically disposed side portion;

(f) said first support member having an inclined ramp portion associated therewith;

(g) a first pulley rotatably mounted on said upper side of said first support tube at said inner end thereof;

(h) a second pulley rotatably mounted on said upper side of said second support tube at said inner end thereof;

(i) a winch mounted on said upper side of said conductor tube which includes a horizontally disposed axle which is disposed transversely with respect to the longitudinal axis of said conductor tube;

(j) said winch including means for rotating said axle thereof in first and second directions;

(k) a first winch cable having first and second ends;

(l) said first end of said first winch cable being secured to and wound upon said axle in a first direction;

(m) said first winch cable extending from said winch so as to pass around said first pulley and thence downwardly therefrom;

(n) said second end of said first winch cable being secured to said first tubular support member;

(o) a second winch cable having first and second ends;

(p) said first end of said second winch cable being secured to and wound upon said axle in a second direction which is opposite said first direction;

(q) said second winch cable extending from said winch so as to pass around said second pulley and thence downwardly therefrom;

(r) said second end of said second winch cable being secured to said second tubular support member;

(s) said first wheel receiving support configured to have a wheel of the lawn mower supported thereon and partially received therein whereby said first wheel receiving support extends completely around the wheel;

(t) said second wheel receiving support configured to have a wheel of the lawn mower supported thereon and partially received therein whereby said second wheel receiving support extends completely around the wheel;

(u) the rotation of said axle in said first direction causing said first and second tubular supports and said first and second wheel receiving supports to be moved vertically upwardly on said first and second post members respectively; and (v) the rotation of said axle in said second direction causing said first and second tubular supports and said first and second wheel receiving supports to be moved vertically downwardly on said first and second post members;

a first pin configured to be received in one of said pin openings in said first post member below said first tubular support when said first tubular support and said first wheel receiving support have been moved vertically upwardly with respect to said first post member;

a second pin configured to be received in one of said pin openings in said second post member below said second tubular support member when said second wheel receiving support has been moved vertically upwardly with respect to said second post member; and said first and second pins when inserted into one of the pin openings in said first and second post members preventing said first and second wheel supports from moving downwardly with respect to said first and second post members respectively.

2. The lift of claim 1 wherein said first support leg extends horizontally outwardly and laterally from said first post member and wherein said third support leg extends horizontally outwardly and laterally from said second post member.

\* \* \* \* \*